(12) United States Patent
Wilson

(10) Patent No.: US 8,602,422 B2
(45) Date of Patent: *Dec. 10, 2013

(54) THREE WHEELED SCOOTER WITH REAR SKATE TRUCK AND FIXED FRONT WHEEL

(75) Inventor: Stephen S. Wilson, Las Vegas, NV (US)

(73) Assignee: SBYKE USA LLC, Las Vegas, NV (US)

( * ) Notice: Subject to any disclaimer, the term of this patent is extended or adjusted under 35 U.S.C. 154(b) by 121 days.

This patent is subject to a terminal disclaimer.

(21) Appl. No.: 13/014,930

(22) Filed: Jan. 27, 2011

(65) Prior Publication Data

US 2012/0146303 A1 Jun. 14, 2012

Related U.S. Application Data

(63) Continuation-in-part of application No. 12/963,899, filed on Dec. 9, 2010.

(51) Int. Cl.
*A63C 17/00* (2006.01)
(52) U.S. Cl.
USPC .................................. 280/11.27; 280/87.042
(58) Field of Classification Search
USPC .............................. 280/87.042, 11.27, 11.28
See application file for complete search history.

(56) References Cited

U.S. PATENT DOCUMENTS

| | | | |
|---|---|---|---|
| 322,504 A | 7/1885 | Thompson | |
| 329,556 A | 11/1885 | Hirt | |
| 329,557 A | 11/1885 | Hirt | |
| 537,689 A | 4/1895 | Kouns | |
| 638,963 A | 12/1899 | Ganswindt | |
| 865,441 A | 9/1907 | Slocom | |
| 1,213,454 A | 1/1917 | Brown | |
| 1,342,688 A | 6/1920 | Heller et al. | |
| 1,548,973 A | 8/1925 | Burleigh | |
| 1,599,223 A | 9/1926 | Epps | |
| 1,607,972 A | 11/1926 | Mangold | |
| 2,330,147 A | 9/1943 | Rodriguez | |
| 3,203,706 A | 8/1965 | Boyden | |
| 3,284,096 A | 11/1966 | Hansen et al. | |
| 3,392,991 A | 7/1968 | Ryan | |

(Continued)

FOREIGN PATENT DOCUMENTS

| AU | 610642 | 5/1991 |
|---|---|---|
| CN | 2501789 Y | 7/2002 |

(Continued)

OTHER PUBLICATIONS

Triton, Triton Pro, Asa Products. Asa Products, Inc. Copyright 2004. 2 pages. <http://www.asaproducts.com/PhotoGallery.asp?ProductCode=Tri%2D001+Red>.

(Continued)

*Primary Examiner* — John Walters
(74) *Attorney, Agent, or Firm* — Stetina Brunda Garred & Brucker

(57) ABSTRACT

A scooter is disclosed which positions a center of gravity of a rider toward the front the scooter so that the rider can more easily perform a 180 degree turn trick. Since the rider is positioned closer to the front wheel, it becomes easier for the rider to flip over the handlebars. Fortunately, the scooter reduces a moment arm that defines a deceleration moment to reduce the likelihood that the rider will flip over the front handlebars.

11 Claims, 13 Drawing Sheets

(56) References Cited

U.S. PATENT DOCUMENTS

| | | |
|---|---|---|
| 3,442,528 A | 5/1969 | Rademacher |
| 3,652,101 A | 3/1972 | Pivonka |
| 3,860,264 A | 1/1975 | Douglas et al. |
| 3,891,225 A | 6/1975 | Sessa et al. |
| 3,992,029 A | 11/1976 | Washizawa et al. |
| 4,047,725 A | 9/1977 | Pinchock |
| 4,061,351 A | 12/1977 | Bangle |
| 4,082,307 A | 4/1978 | Tait |
| 4,103,921 A | 8/1978 | Brooks |
| 4,194,752 A | 3/1980 | Tilch et al. |
| 4,198,072 A | 4/1980 | Hopkins |
| 4,359,231 A | 11/1982 | Mulcahy |
| 4,469,343 A | 9/1984 | Weatherford |
| 4,526,390 A | 7/1985 | Skolnik |
| 4,624,469 A | 11/1986 | Bourne |
| 4,657,272 A | 4/1987 | Davenport |
| D289,985 S | 5/1987 | Davenport |
| D295,428 S | 4/1988 | Cummings |
| D295,989 S | 5/1988 | Cummings |
| D300,756 S | 4/1989 | Cummings |
| 4,863,182 A | 9/1989 | Chern |
| 5,046,747 A | 9/1991 | Nielsen, Jr. |
| 5,127,488 A | 7/1992 | Shanahan |
| 5,551,717 A | 9/1996 | De Courcey |
| 5,620,189 A | 4/1997 | Hinderhofer |
| 5,839,742 A | 11/1998 | Holt |
| 5,853,182 A | 12/1998 | Finkle |
| 5,931,738 A | 8/1999 | Robb |
| 5,975,546 A | 11/1999 | Strand |
| 6,220,612 B1 | 4/2001 | Beleski, Jr. |
| D444,184 S | 6/2001 | Kettler |
| 6,250,656 B1 | 6/2001 | Ibarra |
| 6,315,304 B1 | 11/2001 | Kirkland et al. |
| 6,318,739 B1 | 11/2001 | Fehn |
| 6,467,781 B1 | 10/2002 | Feng |
| 6,499,751 B1 | 12/2002 | Beleski, Jr. |
| 6,523,837 B2 | 2/2003 | Kirkland |
| 6,572,130 B2 | 6/2003 | Greene et al. |
| 6,595,536 B1 | 7/2003 | Tucker |
| 6,715,779 B2 | 4/2004 | Eschenbach |
| 6,739,606 B2 | 5/2004 | Rappaport |
| 6,942,235 B2 | 9/2005 | Chang |
| 7,007,957 B1 | 3/2006 | Lee |
| 7,044,491 B2 | 5/2006 | Kettler et al. |
| 7,140,621 B2 | 11/2006 | Cheng |
| 7,192,038 B2 | 3/2007 | Tsai |
| 7,540,517 B2 | 6/2009 | Wernli |
| 8,152,176 B2 * | 4/2012 | Wilson et al. .............. 280/11.27 |
| 2004/0012166 A1 | 1/2004 | Reginato |
| 2005/0116430 A1 | 6/2005 | Chen |
| 2005/0139406 A1 | 6/2005 | McLeese |
| 2006/0042844 A1 | 3/2006 | Kirkpatrick |
| 2006/0049595 A1 | 3/2006 | Crigler et al. |
| 2008/0217085 A1 | 9/2008 | Wernli |
| 2009/0066150 A1 | 3/2009 | O'Rourke, Sr. |

FOREIGN PATENT DOCUMENTS

| | | |
|---|---|---|
| DE | 4424297 A1 | 1/1996 |
| FR | 2859111 A1 | 3/2005 |
| FR | 2859166 A1 | 3/2005 |
| GB | 2225990 | 6/1990 |
| JP | 6254200 A | 9/1994 |
| JP | 10211313 A | 8/1998 |
| JP | 2006151032 A | 6/2006 |

OTHER PUBLICATIONS

Wikipedia, "Caster Angle", http://en.wikipedia.org/wiki/Caster_angle; Oct. 10, 2009; 2 pages.

Mongoose Bikeboard; "Velocite Mongoose BikeBoard 24V"; http://bikeboardusa.com/velocite_Bike_Board_24V.asp; 2007; 2 pages.

Cave, Steve; "How to Replace Skateboard Bushings"; www.about.com/od/boardmaintenane/ss/replacebushings.htm (14 pages).

Lee W. Young, Patent Cooperation Treaty, International Search Report, pp. 1-6.

\* cited by examiner

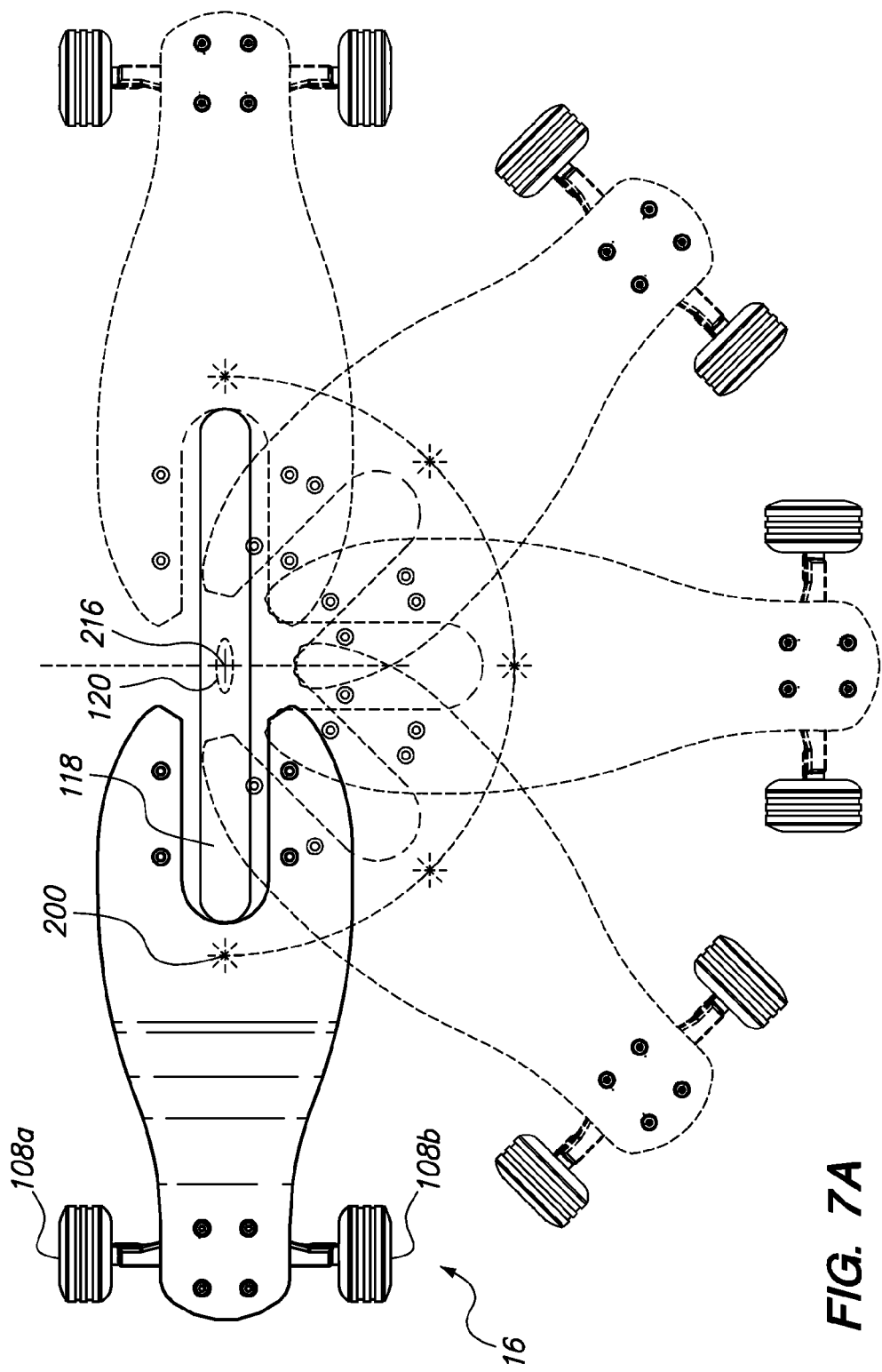

THREE WHEELED SCOOTER WITH REAR SKATE TRUCK AND FIXED FRONT WHEEL

CROSS-REFERENCE TO RELATED APPLICATIONS

This application is a continuation in part application of U.S. patent application Ser. No. 12/963,899, Filed Dec. 9, 2010, the entire contents of which is expressly incorporated herein by reference.

STATEMENT RE: FEDERALLY SPONSORED RESEARCH/DEVELOPMENT

Not Applicable

BACKGROUND

The present invention relates to a skateboard or scooter.

Prior art skate trucks are fabricated in the following manner. A hanger of the skate truck pivots about a nose. The hanger is biased to the straight forward neutral position by an elastomeric member. However, the elastomeric member must be sufficiently rigid so that the rider's weight does not over power the bias force created by the elastomeric member. Additionally, the elastomeric member must be pre-tensioned to a specific amount to properly support the weight of the rider. These factors limit rotation of the hanger of the prior art skate truck to a narrow range. Moreover, there is a danger that the elastomeric member may bottom out as the rider progresses into a turn thereby inadvertently lifting the outside wheels of the skate truck.

These prior art skate trucks are mounted to a deck of a skate board. Traditionally, one prior art skate truck is attached to each of the forward and rear portions in reverse fashion. When the deck of the skate board is rolled to the left or right, the skate board is directed in such direction. Unfortunately, the feeling experienced by the rider in turning the skate board is less than optimal.

Accordingly, there is a need in the art for an improved skate truck with a wide pivot range and a truck that can accommodate a wider weight range of riders and scooter with the skate truck.

BRIEF SUMMARY

The present invention addresses the needs discussed above, discussed below and those that are known in the art.

A stable skate truck that provides for a wide yaw angle and weight range of riders is provided. The skate truck has at least three (3) ball bearings that slide within grooves formed in one of either a base or hanger of the skate truck. The grooves match the ball bearings and have a ramp configuration to push the hanger away from the base as the skate truck progresses into a turn. The ramps of the grooves may have different profiles such as regressive, progressive, linear and combinations thereof to provide the rider a different feel as the rider progresses into a turn A spring is preloaded and biases the hanger towards the base so that the truck is normally in the straight forward direction. As the skate truck progresses into a turn, the ball bearings slide within the grooves and the spring is compressed to urge the ball bearings back to the center of the ramps and to urge the truck back to the straight forward direction. The spring assists in stabilizing the vehicle. A second component that stabilizes the vehicle is the centrifugal force created as the rider progresses into a turn. The centrifugal force applies a variable downward force on a deck of the vehicle based on the turn radius. The centrifugal force is translated to the ball bearings and urges the ball bearing back to the center of the ramp further urging the truck back to the straight forward direction. Another component that stabilizes the vehicle is the weight of the rider. The weight of the rider also urges the ball bearings back to the center of the ramp. Since the weight of the rider urges the ball bearings back to the center of the ramp, the preload on the spring can be used for a wider weight range of riders.

More particularly, a suspension for a vehicle is disclosed. The suspension may comprise a base, a hanger and three ball bearings. The based may be mounted to a frame of the vehicle. The base may have three semi-circularly shaped grooves within a first common plane. The three semi-circularly shaped grooves may have a first center point. The three semi-circularly shaped grooves may have a radius r. The three semi-circularly shaped grooves may define a pivot axis perpendicular to the first common plane and located at the first center point. The pivot axis may be skewed with respect to a longitudinal axis of the frame of the vehicle.

Wheels may be mounted to the hanger so that the vehicle can roll on a surface. The hanger may have three mounting recesses within a second common plane. The three mounting recesses may define a second center point wherein a distance between the three mounting recesses and the second center point is r. The second common plane of the hanger may be disposed parallel to the first common plane of the base. The second center point may be positioned on the pivot axis.

The three ball bearings may be seated within the mounting recesses and traversable along the three semi-circularly shaped grooves when the hanger rotates about the pivot axis.

The suspension may further comprise a biasing member for urging the first and second common planes closer to each other so that the ball bearings slide within the grooves as the hanger rotates about the pivot axis. The biasing member may be a compression spring.

Each of the three semi-circularly shaped grooves may have a contact surface which defines a ramp profile. The ball bearings may slide against the contact surface and compress or decompress the compression spring as the ball bearings slide against the contact surface based on the ramp profile. The ramp profiles of the three semi-circularly shaped grooves may be identical to each other. The ramp profiles may be progressive, regressive, linear or combinations thereof. Also, the three semi-circularly shaped grooves may be symmetrically identical to each other.

The suspension may further comprise a thrust bearing disposed between the compression spring and the hanger to mitigate binding between the hanger and the spring as the hanger rotates about the pivot axis.

Moreover, a vehicle with the suspension system is disclosed. In particular, the vehicle may comprise a deck and a first suspension system. The deck may define a front portion, a rear portion, a bottom surface and a top surface.

The first suspension system may be mounted to the bottom surface at the rear portion of the deck. The first suspension may comprise a base, a hanger, and three ball bearings. The base may be mounted to a frame of the vehicle. The base may have three semi-circularly shaped grooves within a first common plane. The three semi-circularly shaped grooves may have a first center point. The three semi-circularly shaped grooves may have a radius r1. The three semi-circularly shaped grooves may define a pivot axis perpendicular to the first common plane and located at the first center point. The pivot axis may be skewed with respect to a longitudinal axis of the deck.

The hanger may be used to mount wheels so that the vehicle can roll on a surface. The hanger may have three mounting recesses within a second common plane. The three mounting recesses may define a second center point wherein a distance between the three mounting recesses and the second center point is r1. The second common plane of the hanger may be disposed parallel to the first common plane of the base. The second center point may be positioned on the pivot axis.

The three ball bearings may be seated within the mounting recesses and traversable along the three semi-circularly shaped grooves when the hanger rotates about the pivot axis.

The vehicle may further comprise a second suspension system mounted to the bottom surface at the front portion of the deck. The first and second suspension systems may be mounted in opposite directions to each other. The second suspension system may also comprise a base, a hanger and three ball bearings. The base may be mounted to a frame of the vehicle. The base may have three semi-circularly shaped grooves within a first common plane. The three semi-circularly shaped grooves may have a first center point. The three semi-circularly shaped grooves may have a radius r2. The three semi-circularly shaped grooves may define a pivot axis perpendicular to the first common plane and located at the first center point.

With respect to the second suspension system, the hanger may be used to mount wheels so that the vehicle can roll on a surface. The hanger may have three mounting recesses within a second common plane. The three mounting recesses may define a second center point wherein a distance between the three mounting recesses and the second center point is r2. The second common plane of the hanger may be disposed parallel to the first common plane of the base. The second center point may be positioned on the pivot axis.

With respect to the second suspension system, the three ball bearings may be seated within the mounting recesses and traversable along the three semi-circularly shaped grooves when the hanger rotates about the pivot axis.

Additionally, a three wheeled scooter is disclosed. The scooter may comprise a deck, a fixed front wheel, a handlebar and a skate truck. The deck supports a rider. The deck defines a forward portion and a rear portion. The forward portion may be disposed at a lower elevation compared to the rear portion. The fixed front wheel may be mounted to a forward portion of the deck. The handlebar may be mounted to the forward portion of the deck. The skate truck may be mounted to the rear portion. The skate truck may be yawable to turn the scooter to the left or right during rolling of the deck.

The forward portion of the deck may define left and right outer portions. The left and right outer portions may be turned upward so that the deck can be rolled during tight turning of the scooter.

The front wheel has a rotational axis disposed above an upper surface of the front portion of the deck. The front wheel may be about 6 to 10 times larger than rear wheels attached to the skate truck. For example, the front wheel may be a 20" bicycle wheel.

A rotational axis of the rear wheels attached to the skate truck may be below the rotational axis of the front wheel. The deck may be closer to the rotational axis of the rear wheels compared to the rotational axis of the front wheel.

The deck may have a slot for receiving the front wheel. A foot guard may be disposed at a periphery of the slot. A flexible fender may be disposed behind the front wheel for covering a rear side of the front wheel.

A fork may be mounted to the forward portion of the deck. The front wheel may be mounted to the fork. The handlebar may be mounted to a crown of the fork.

Moreover, a three wheeled scooter for transporting a rider is disclosed. The scooter may comprise a deck, a fixed front wheel, a handlebar and a skate truck. The deck supports the rider. The deck may define a forward portion and a rear portion. The deck may have a slot in the forward portion of the deck. A longitudinal axis of the slot may be aligned to a forward direction of the scooter. The fixed front wheel may be mounted to a forward portion of the deck. The front wheel may be positioned at least partially within slot so that a rider of the scooter can position his/her feet closely adjacent to the front wheel. The handlebar may be mounted to the forward portion of the deck. The skate truck may be mounted to the rear portion. The skate truck is yawable to turn the scooter to the left or right during rolling of the deck.

The scooter may further comprise a foot guard disposed at an inner periphery of the elongate slot of the deck. The foot guard may extend up from the deck so that feet of the rider does not rub against the front wheel when the rider is standing closer to the front wheel than the rear wheels.

The scooter may further comprise a front wheel guard disposed behind the front wheel for protecting legs of the rider during riding wherein the front wheel guard is sufficiently flexible so that the front wheel guard bends and contacts the front wheel when legs of the rider inadvertently pushes against the front wheel guard to make a noise and warn the rider of danger.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 7A is a top view of the scooter show in FIG. 7 wherein the scooter is swung 180° about a contact patch;

DETAILED DESCRIPTION

Figure 1:
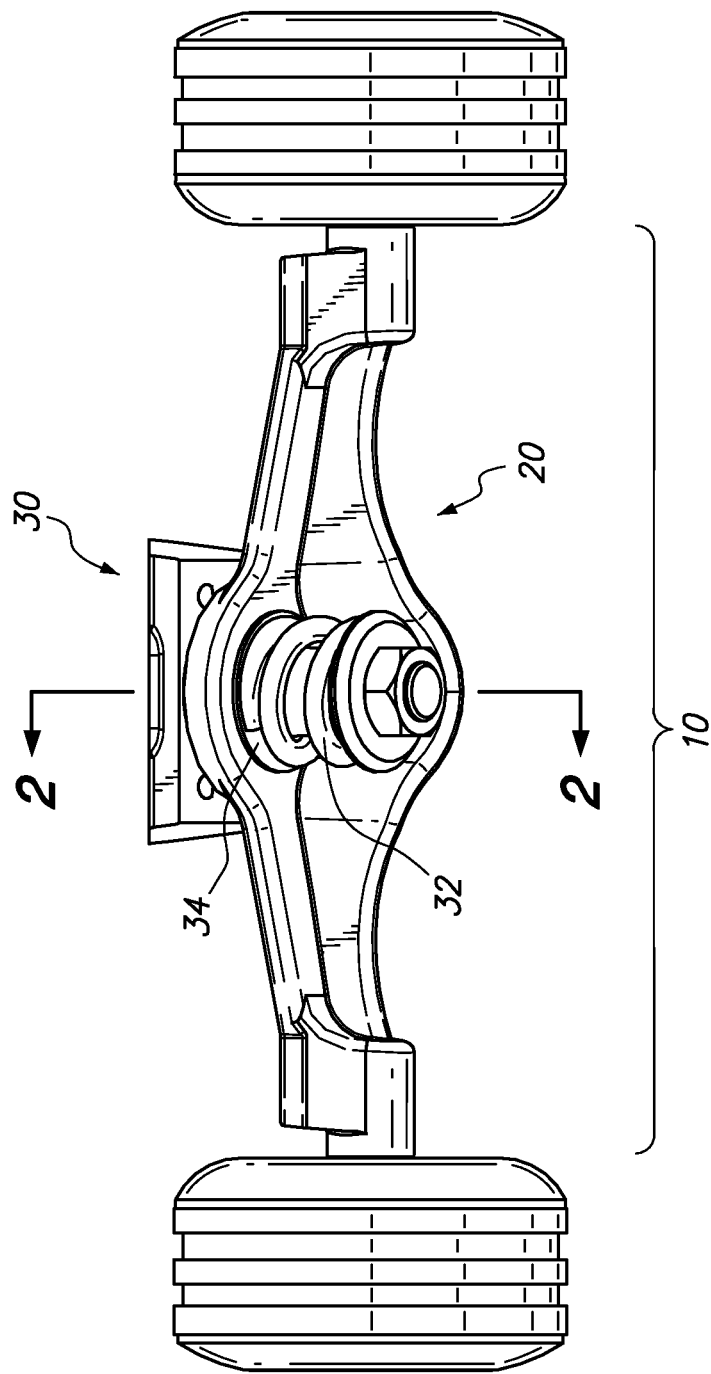
FIG. 1 is a bottom view of a skate truck.

Referring now to the drawings, a skate truck 10 is shown. The skate truck may be mounted to a bottom surface 12 of a deck 14 of a scooter, skateboard or like vehicle 16 (See FIGS. 2, 2A and 6). When the deck 14 is rotated about its central longitudinal axis 18 (see FIG. 2), a hanger 20 may be yawed about a pivot axis 22 (See FIG. 3) to turn the vehicle left or right. The pivot axis 22 is defined by three semi-circularly shaped grooves 24 a-c and three bearings 26 a-c that slide within the grooves 24 a-c (see FIG. 4) as the hanger 20 rotates about the pivot axis 22. The bearings 26 a-c are seated within mounting recesses 28 a-c. The grooves 24 a-c may have a ramp profile. The ramp profile may have left and right sides 29a, b (see FIG. 4) which are identical to each other so that as the rider turns left or right, the response of the skate truck 10 is identical on the left and right sides 29a, b. For each of the sides of the ramp profile, the ramp may push the ball bearings 26 a-c further away out of the groove 24 a-c as the rider progresses in the turn. This pushes the hanger 20 further away from the base 30. As the hanger 20 is pushed further away from the base 30, spring 32 is compressed to increase a spring force and stabilize the vehicle by biasing the vehicle 16/truck 20 back to the straight forward direction.

Three components urge the hanger 20 back to its normal straight-forward position to stabilize the vehicle during turns and straight-forward motion. In particular, the spring force of the spring 32 urges the ball bearings 26 a-c back to a center 31 of the ramp of the grooves 24 a-c. Additionally, the weight of the rider urges the ball bearings 26 a-c back to the middle or lowest portion 31 of the ramp defined by the groove 24 a-c to dynamically account for the weight of the rider. The third component is related to the centrifugal force created during turning of the vehicle 16. When the rider turns, the centrifugal force applies a variable downward force based on the turn radius onto the deck 14 of the vehicle 16. This downward force also urges the ball bearings 26 a-c back to the center 31 of the ramp of the grooves 24 a-c.

The hanger 20 is supported by the bearings 26a-c and thrust bearing 34 and does not directly contact the base 30 or the spring 32. Accordingly, the rotation of the hanger 20 does not cause the hanger 20 to rub against the spring 32 or the base 30. The hanger does not bind against the base 30 and the spring 32 as the hanger 20 rotates about the pivot axis 22. As such, turning of the vehicle is smooth and effortless.

Accordingly, the skate truck 10 disclosed herein provides for a stable platform which stabilizes the vehicle 16 toward the straight-forward direction and also dynamically accounts for the weight of the rider and the turning motion to further urge the skate truck 10 back to its normal straight-forward direction. Moreover, the hanger 20 rotates about pivot axis 22 and is disposed between two sets of bearings, namely, the sliding bearings 26 a-c and the thrust bearings 34 so as to minimize friction, mitigate binding and promote smooth turning of the vehicle 16.

Figure 3:
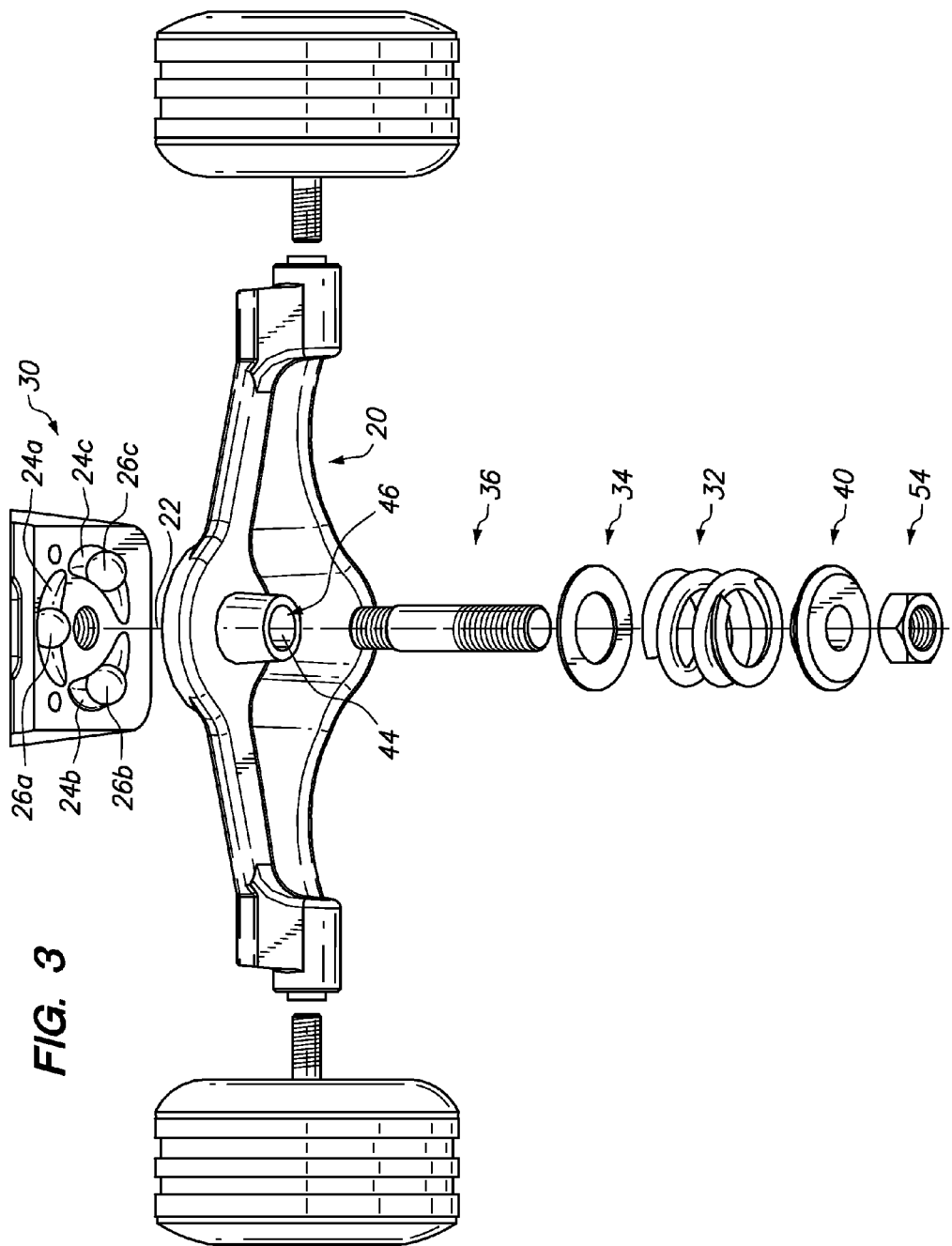
FIG. 3 is an exploded bottom view of the skate truck shown in FIG. 1.

More particularly, referring now to FIG. 1, the skate truck 10 includes the hanger 20 which is supported on both sides by thrust bearing 34 (e.g., needle thrust bearing) and sliding ball bearings 26 a-c (See FIG. 3). When the hanger 20 rotates about the pivot axis 22, the thrust bearing 34 mitigates binding between the spring 32 and the hanger 20. Additionally, the ball bearings 26 a-c slide within grooves 24 a-c which prevents contact between the hanger 20 and the base 30 to mitigate friction between the hanger 20 and the base 30 as the hanger 20 rotates about the pivot axis 22. Accordingly, the thrust bearing 34 and the sliding bearings 26a-c mitigate friction and provide for effortless rotation of the hanger 20.

Figure 2:
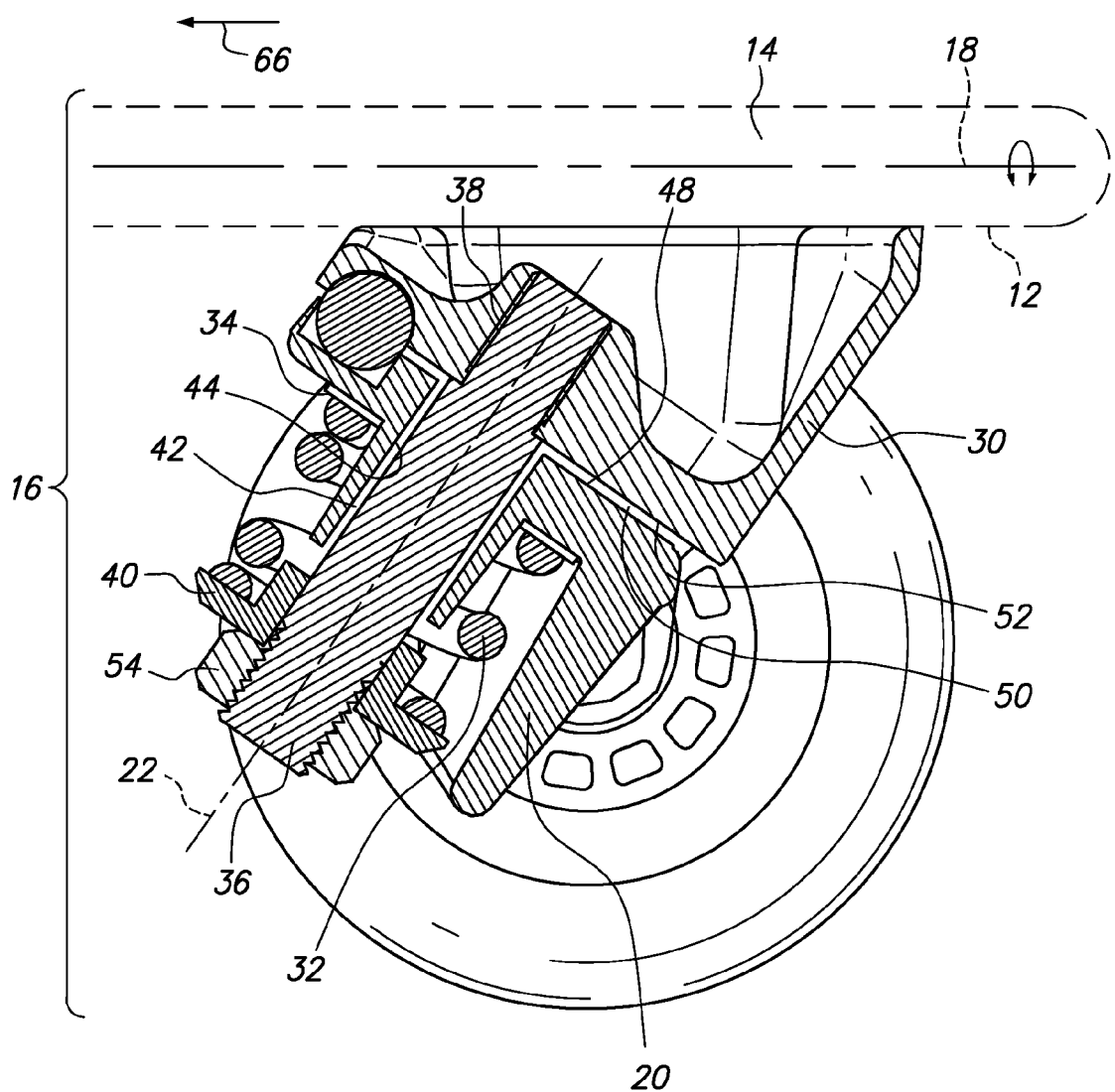
FIG. 2 is a cross sectional view of the skate truck shown in FIG. 1.

Referring now to FIG. 2, the hanger 20 is biased toward the base 30 by way of spring 32. A retaining pin 36 and a spring retainer 40 locates the spring 32. Although a compression spring is shown for spring 32, other types of springs are also contemplated. The retaining pin 36 may be threaded into the base 30 with threaded connection 38. The pin 36 may have a central axis which is aligned to the pivot axis 22. However, the pin 36 does not define the pivot axis 22 of the hanger 20. The pin 36 merely holds the assembly together. The grooves 24 a-c (see FIG. 3) formed in the base 30 define the pivot axis 22. In support thereof, the ball bearing 26 a-c remain fixed within the mounting recesses 28 a-c (see FIG. 4) of the hanger 20. The mounting recesses 28 a-c are all within a common plane. As the hanger 20 rotates about the pivot axis 22, all of the ball bearing 26 a-c contact the ramps of the grooves 24 a-c at the same position. The ball bearings 26 a-c move in unison with each other. When the hanger 20 rotates about the pivot axis 22, the ball bearings 26 a-c ride up and down on the ramps of the grooves 24 a-c at the same position. Since the ball bearings 26a-c track the grooves 24a-c, the grooves 24a-c define the pivot axis 22. The retaining pin 36 merely holds the ball bearings 26 a-c, hanger 20, spring 32 and the spring retainer 40 together but does not determine the pivot axis 22 of the hanger 20. To further show that the retaining pin 36 merely holds the assembly together and does not define the pivot axis, a gap 42 (see FIG. 2) is shown between the retaining pin 36 and the interior surface 44 of a hole 46 (see FIG. 3) formed in the hanger 20. This illustrates that the retaining pin 36 does not guide rotation of the hanger 20 but only holds the assembly together eliminating friction between the retaining pin 36 and the hanger 20.

Referring still to FIG. 2, a medial surface 48 of the hanger 20 is gapped 50 away from the medial surface 52 of the base 30 to mitigate rubbing friction between the hanger 20 and the base 30. A nut 54 may be threaded onto the retaining pin 36 to compress spring 32 and hold the assembly together. The nut 54 may be a self locking nut or the threaded connection may be coated with a chemical thread locker to mitigate loosening due to vibration. The spring force of the spring 32 biasing the hanger 20 toward the base 30 may be adjusted by screwing the nut 54 further down the retaining pin 36 or up off of the retaining pin 36. The nut 54 is adjusted to adjust the spring force of spring 32 to either stiffen or loosen the suspension provided by the skate truck 10. The nut adjustment is made to account for the weight of the rider. For heavier riders, the spring 32 is proloaded to a greater amount compared to a lighter rider. Regardless, since the weight of the rider also biases the truck to the straight forward direction, the spring preload for a particular rider can be used for a greater range of rider weights.

Referring now to FIGS. 5A-F, a spring force of the spring 32 as a function of degree of rotation of the hanger 20 is shown. Only one side of the ramp is shown in FIGS. 5A-F. In particular, positive rotation of hanger 20 from the straight forward direction. The other side of the ramp (i.e., negative rotation) is identical to the side shown in FIGS. 5A-F but not shown for purposes of clarity. The graphs in FIGS. 5A-F represent various potential ramp profiles of the grooves 24 a-c. At zero degree rotation of the hanger 20, the vehicle 16 is going straight-forward. For each degree of rotation, the ramps of the grooves 24 a-c urge the ball bearing 26 a-c up the ramp. As the ball bearings 26 a-c are urged up the ramp, the ball bearing 26 a-c push the hanger 20 away from the base 30 and the spring is deflected. Typically, total deflection or lift is about 0.200 inches. As the spring is deflected, the spring force increases linearly as the spring is deflected within its elastic range. The graphs (see FIG. 5A-F) show the spring force as a function of degree of rotation of the hanger 20 which correlates to the ramp profile of the grooves 24a-c. As discussed above, the spring force of the spring 32 helps in stabilizing the vehicle 16 to bring the hanger 20 back to the straight-forward direction. As can be seen by the graphs, the spring force increases as the hanger 20 progresses into the turn.

Figure 5A:
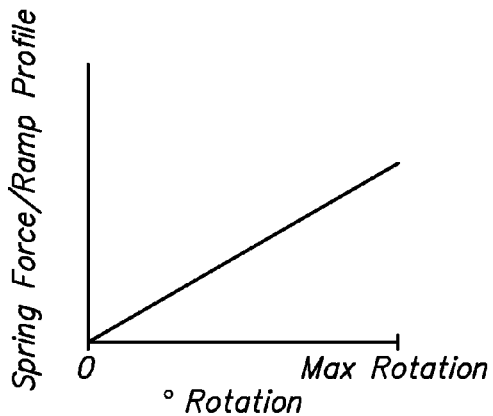
FIG. 5A is a graph illustrating spring force/ramp profile as a function of degree of rotation of the hanger illustrating a first ramp profile.
Figure 5B:
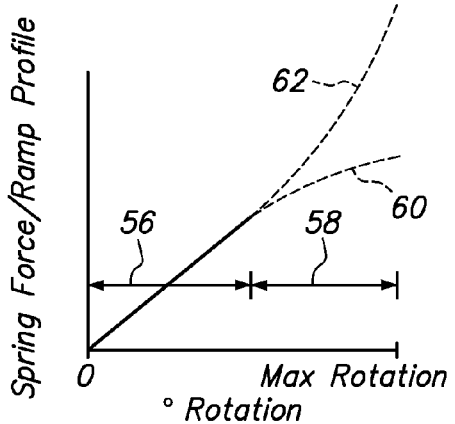
FIG. 5B is a graph illustrating spring force/ramp profile as a function of degree of rotation of the hanger illustrating a second ramp profile.
Figure 5C:
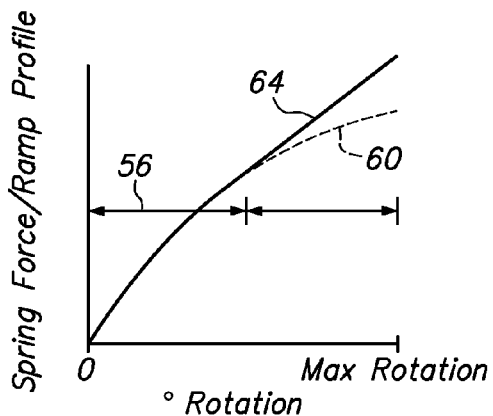
FIG. 5C is a graph illustrating spring force/ramp profile as a function of degree of rotation of the hanger illustrating a third ramp profile.
Figure 5D:
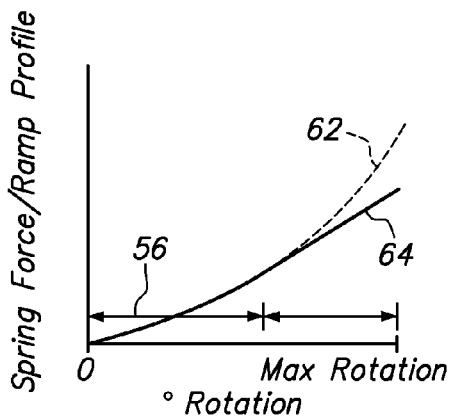
FIG. 5D is a graph illustrating spring force/ramp profile as a function of degree of rotation of the hanger illustrating a fourth ramp profile.
Figure 5E:
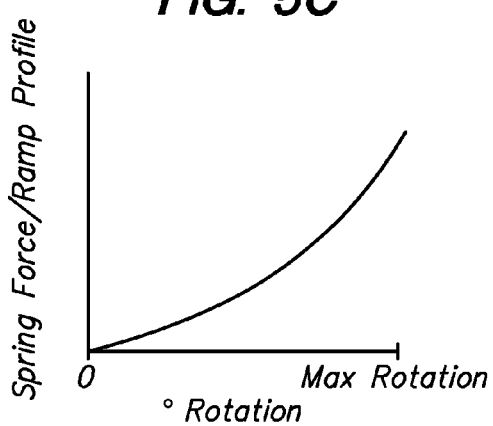
FIG. 5E is a graph illustrating spring force/ramp profile as a function of degree of rotation of the hanger illustrating a fifth ramp profile.
Figure 5F:
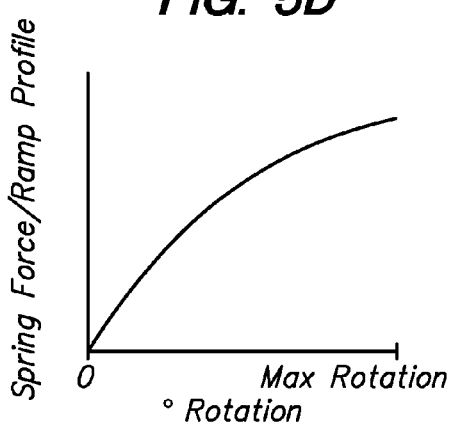
FIG. 5F is a graph illustrating spring force/ramp profile as a function of degree of rotation of the hanger illustrating a sixth ramp profile.

FIG. 5A illustrates a linear ramp profile. For each degree of rotation of the hanger 20, the spring force is increased the same incremental amount until the hanger is fully rotated and the spring force is at its maximum. In FIG. 5B, the ramp is initially linear during the first portion 56 of the hanger rotation. During the second portion 58, for each additional degree of rotation of the hanger 20, the spring force increases at a slower rate as shown by dash-line 60 which characterizes a regressive ramp profile. Alternatively, the ramp profile may be progressive in that for each additional degree of rotation of the hanger 20, the rate at which the spring force increases may accelerate as shown by dash-line 62. Referring now to FIGS. 5C and 5D, the first portion 56 may be regressive as shown in FIG. 5C or progressive as shown in FIG. 5D. The second portion 58 may be linear as shown by lines 64 or may continue on its regressive path 60 shown in FIG. 5C or may continue on its progressive path 62 as shown in FIG. 5D. FIG. 5E illustrates a progressive ramp profile throughout the entire rotation of the hanger 20. Oppositely, FIG. 5F illustrates a regressive ramp profile through the entire rotation of the hanger 20. Accordingly, the ramp profile upon which the ball bearings 26 a-c slide upon may have a linear profile, regressive profile, progressive profile or combinations thereof. The ramp profile can be customized to provide for a custom feel as the rider progresses through a turn on the vehicle 16.

The skate truck 10 described above was shown as having three grooves 24a-c. However, it is also contemplated that more grooves 24d-n may be incorporated into the skate truck 10. For example, the skate truck 10 may have three or more gooves 24a-n. These grooves 24a-n should be symmetrically formed about a point so as to define the pivot axis 22 so that the sliding bearings 26a-c apply even pressure to the ramps of the grooves 24a-n. When three grooves 24a-c are formed in the base 30, the grooves 24a-c can allow a +/− rotation of 60 degrees or less. Preferably, the grooves 24a-c are formed so as to allow for a +/− rotation of about 50 degrees. When four grooves 24 are formed in the base 30, the grooves 24 are formed to allow for rotation of the hanger 20 to about +/−45 degrees or less.

Figure 4:
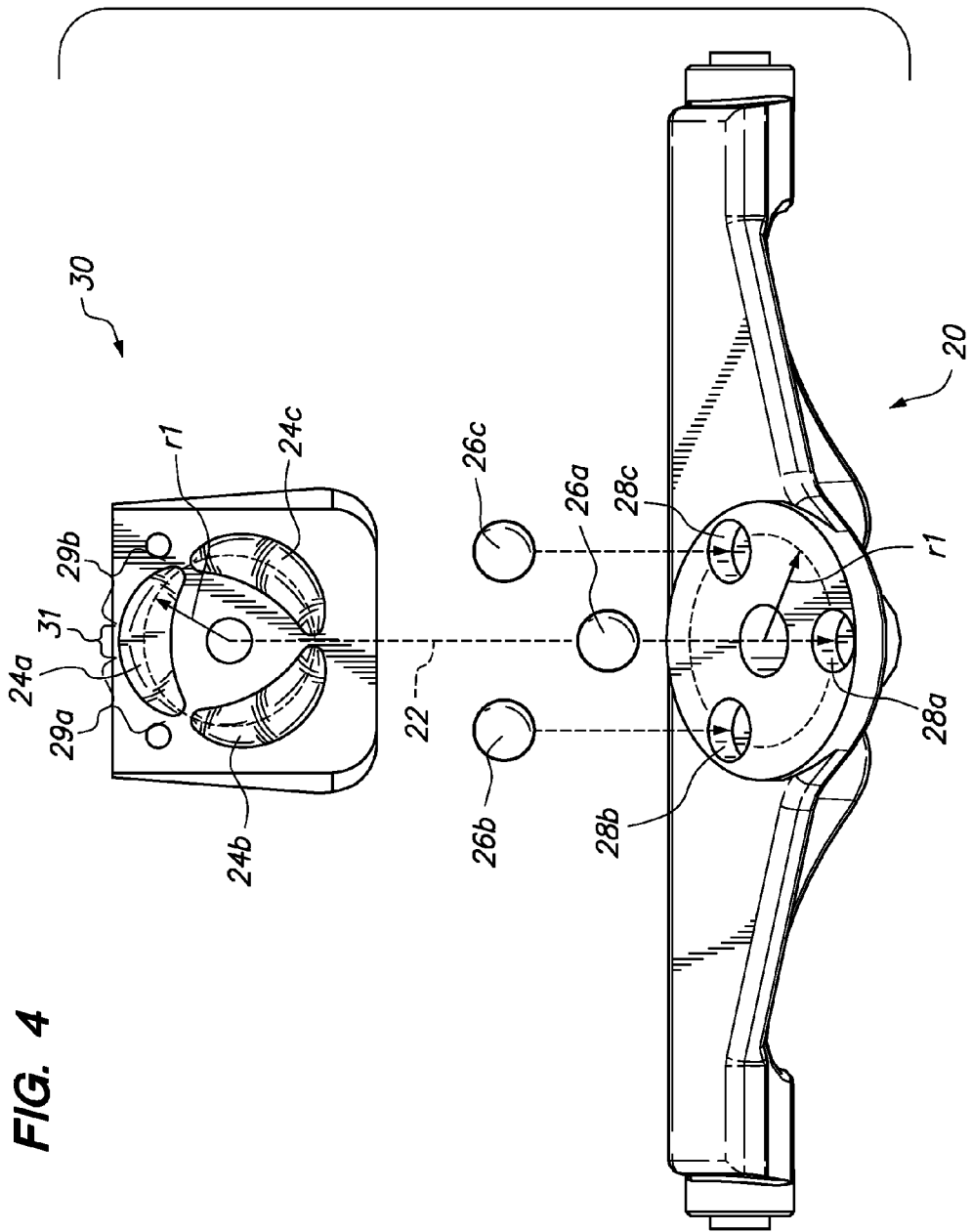
FIG. 4 is an exploded view of a base and hanger shown in FIG. 3 illustrating the assembly of the sliding bearings into grooves and mounting recesses.

Referring now to FIG. 4, the grooves 24a, b, c can have a radius of r1. The center of the radius r1 defines the position of the pivot axis 22. Also, the mounting recesses 28a, b, c can be positioned on a circle having a radius equal to r1.

As discussed above bearings 26a-c are seated within the mounting recesses 28a-c. The bearings 26a-c are also disposed within the grooves 24a-c. The bearings 26a-c do not roll on the ramps defined by the grooves 24a-c. Rather, the bearings 26a-c predominantly slide on the ramp of the grooves 24a-c. To facilitate sliding and not rolling of the bearings 26a-c, grease can be disposed within the grooves 24 so that the sliding bearings 26a-c slides on the ramps defined by the grooves 24a-c. Babbitt material (e.g., zinc) may be coated on the ramps of the grooves 24a-c and the bearings 26a-c may be chrome finished to protect the bearings 26a-c and the ramps of the grooves 24 a-c from the pressure created between the bearings 26a-c and the ramps of the grooves 24a-c The grooves 24a-c may have a semi-circularly shaped cross section and be sized to fit the bearings 26a-c so that the bearings 26a-c contacts the grooves 24a-c along a line transverse to a curved length of the groove. The contact surface (i.e., line) sweeps or slides along the ramps of the grooves 24a-c as the hanger 20 is rotated about the pivot axis 22.

Referring still to FIG. 4, the spring 32 assists in pushing the bearings 26a-c to the lowest most portion 31 of the ramps defined by the grooves 24a-c. In other words, the spring 32 assists in biasing the hanger 20 so that the vehicle goes in the straight forward direction. The weight of the rider also helps in urging the bearings 26a-c down to the lowest most portion of the ramps defined by the grooves 24a-c. This too helps in biasing the hanger so that the vehicle goes in the straight forward direction. A third component that helps in biasing the hanger so that the vehicle goes in the straight forward direction is the centrifugal force created when the rider of the vehicle 16 makes a left or right turn with the vehicle. As the rider progresses into a turn, a centrifugal force is created. The centrifugal force applies a force on the deck 14 of the vehicle 16 based on a turn radius. This centrifugal force is translated to the bearings 26a-c to bias the bearings 26a-c toward the lowest most portion of the ramps defined by the grooves 24a-c.

Figure 2A:
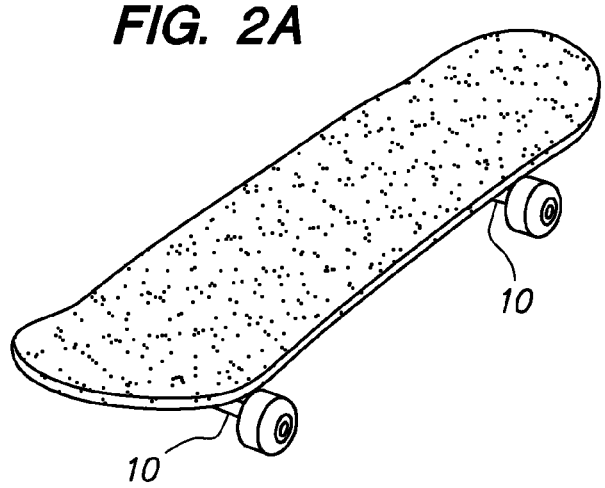
FIG. 2A is an illustration of a skateboard with skate trucks shown in FIG. 1 mounted to front and rear of a deck.

The skate truck 10 can be mounted at the rear of the deck 14 in the orientation shown in FIG. 2. Arrow 66 shows the forward direction of the vehicle. As shown in FIG. 2A, the front of the deck 14 can also be mounted with a second skate truck 10 mounted in a reverse orientation to the truck 10 shown in FIG. 2 so that rolling of the deck 14 turns the vehicle left or right. Other configurations are also contemplated. For example, the skate truck 10 can be mounted at the rear of the deck 14 with a stationary or pivotable single or double front wheel with or without a handle bar. The skate truck can be mounted to the front of the deck 14 with a stationary or pivotable single or double rear wheel. A handle bar can still be mounted to the front of the deck 14.

Figure 4A:
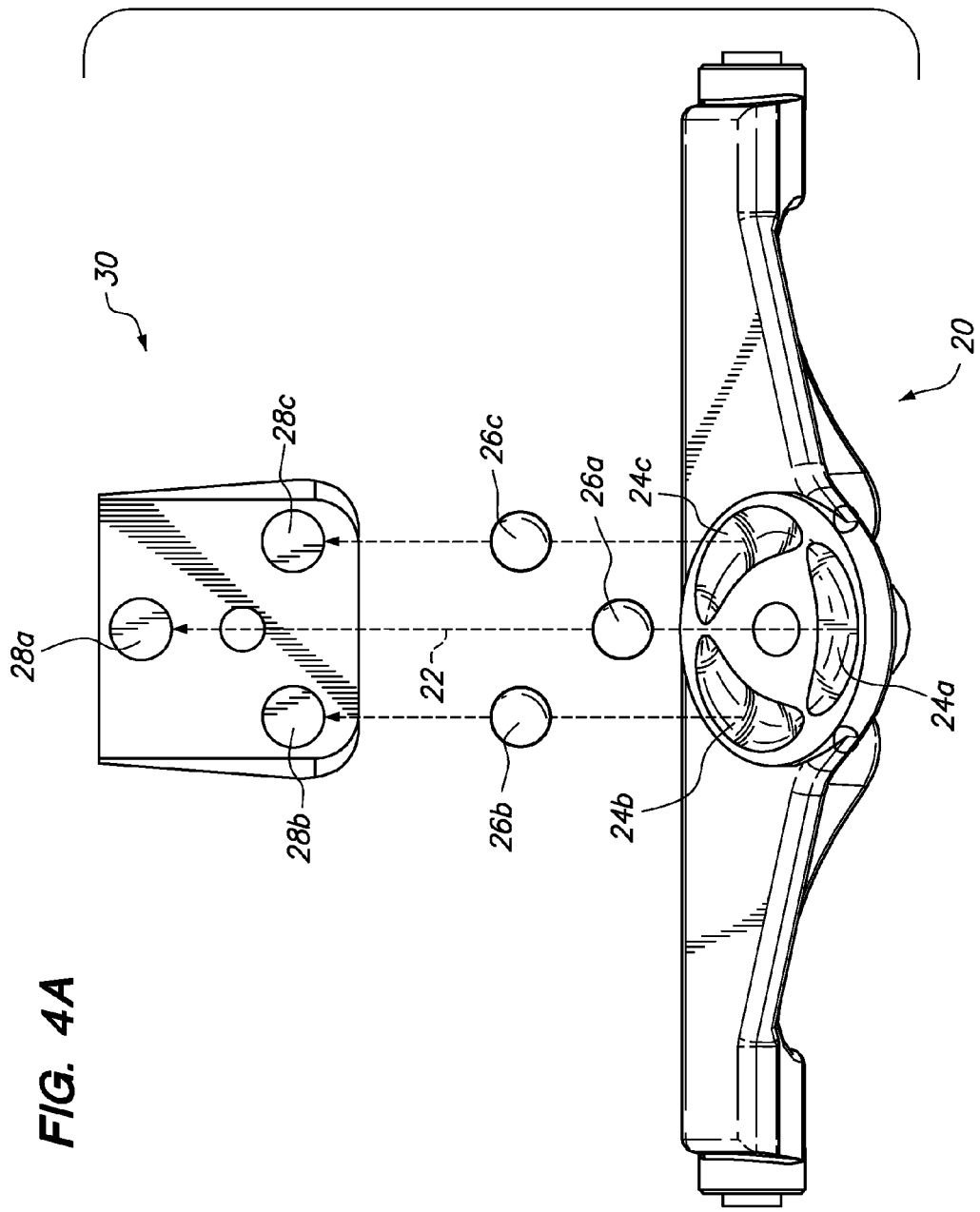
FIG. 4A is an exploded view of a base and hanger illustrating a reverse embodiment shown in FIG. 4.

Referring now to FIG. 4A, the grooves 24 a-c may be formed in the hanger 20 and the mounting recesses 28 a-c may be formed in the base 30.

Figure 6:
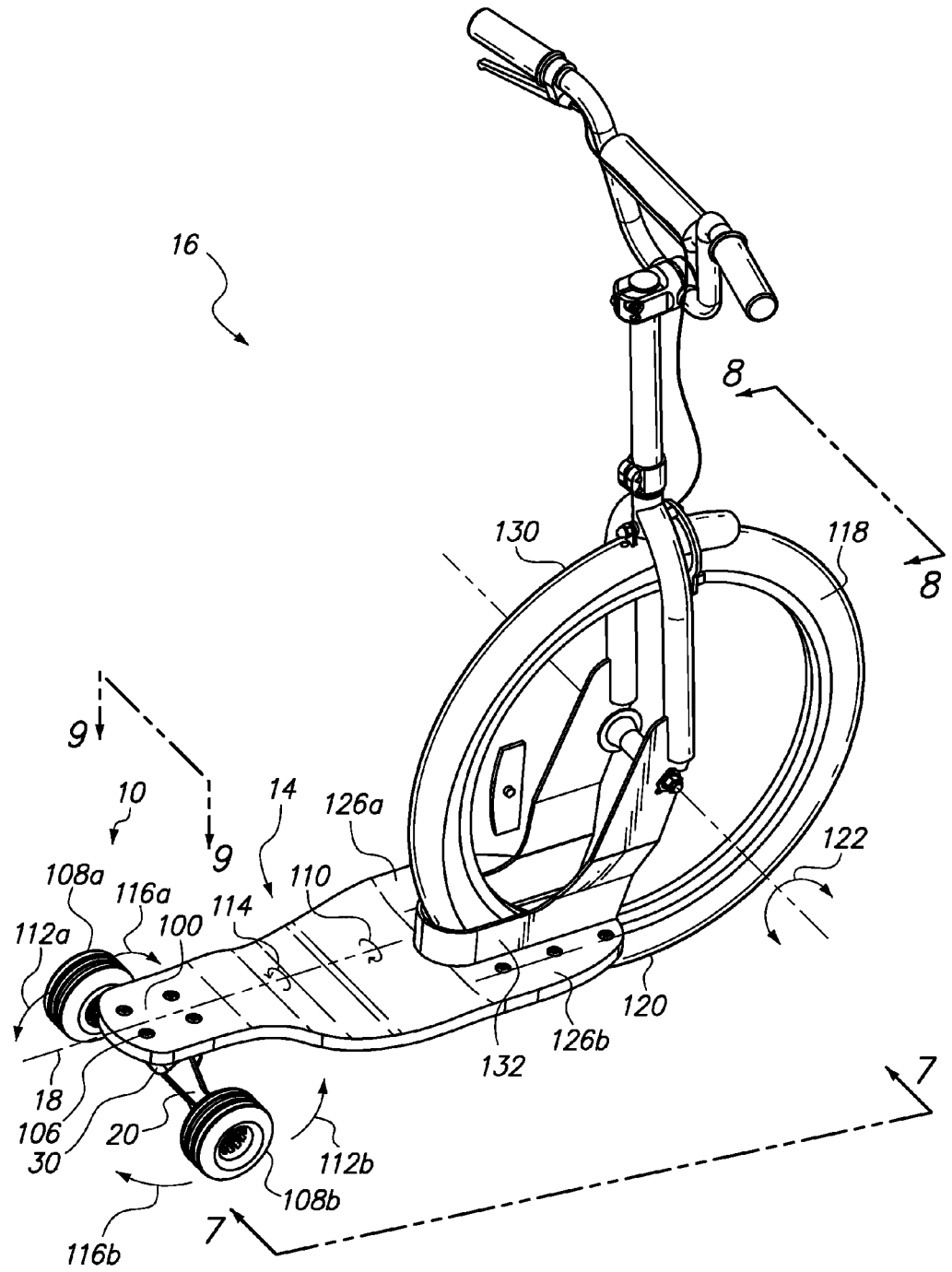
FIG. 6 is a perspective view of a three wheeled scooter with rear skate truck and fixed front wheel.
Figure 7:
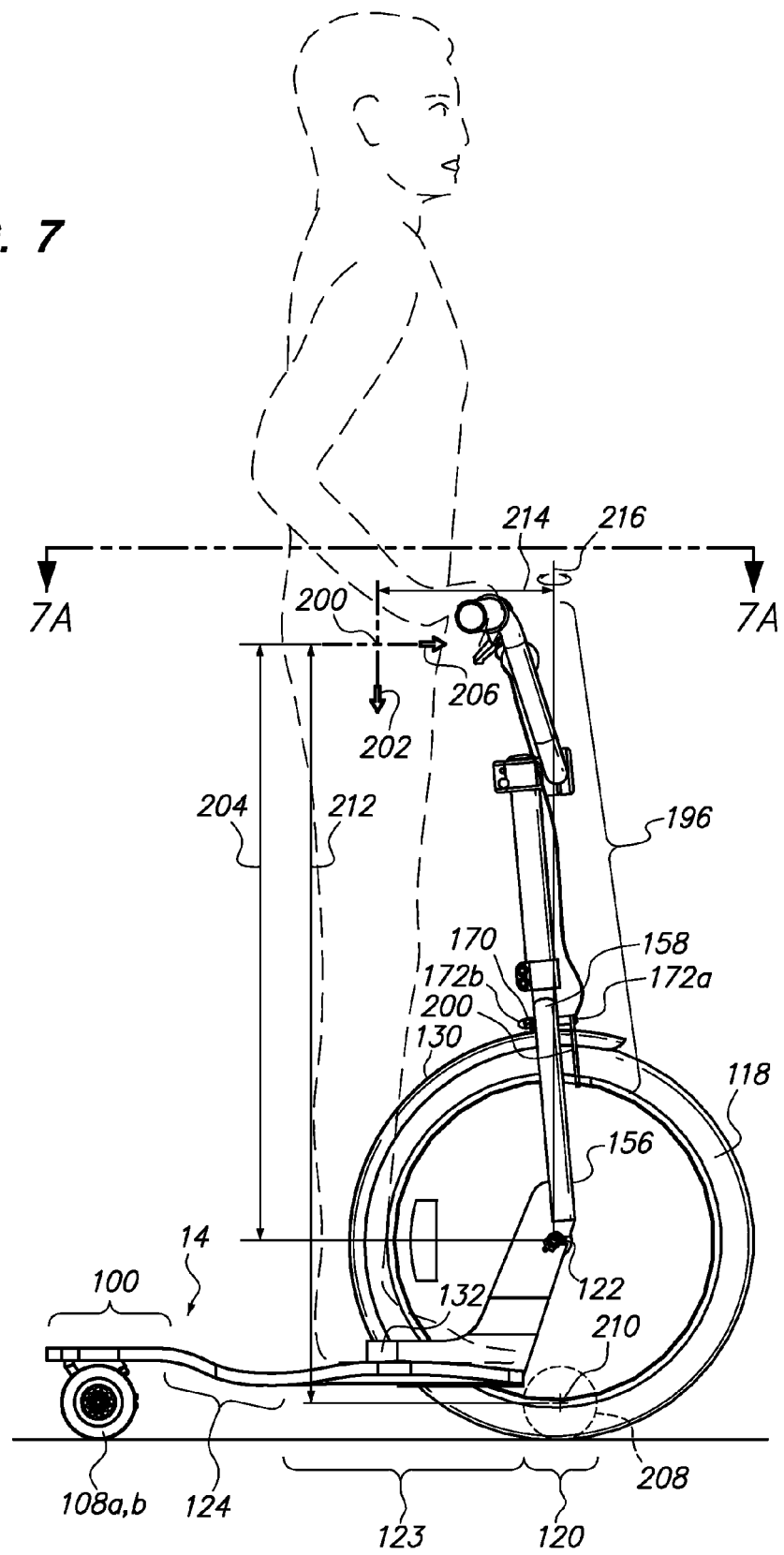
FIG. 7 is a side view of the scooter shown in FIG. 6.

Referring now to FIG. 6, the skate truck 10 may be attached to a rear portion 100 of deck 14. The base 30 of the truck may have four threaded holes that are aligned to countersunk holes formed in the rear portion 100 of the deck 14. The skate truck 10 can be secured to the rear portion 100 of the deck 14 by way of screw 106 wherein the head of the screws 106 is flush with the upper surface of the rear portion 100 of the deck 14. When the rider rolls the deck 14 about its longitudinal axis 18, the hanger 20 and wheels 108 are yawed with respect to the longitudinal axis 18. In particular, when the deck 14 is rolled in direction of arrow 110, the wheels 108 a, b move in direction of arrows 112 a, b to direct the vehicle in the right direction. Conversely, when the deck 14 is rolled in direction of arrow 114, the hanger 20 and the wheels 108 a, b, rotate in the direction of arrows 116 a, b, to direct the vehicle 16 in the left direction. The front wheel 118 does not pivot to turn the vehicle 16. Rather, the front wheel is fixed and stationary with respect to the deck 14. For purposes of turning, the rear portion 100 of the deck 14 shifts to the left to effectuate a right turn or shifts to the right to effectuate a left turn due to the yawing action of the hanger 20 and wheels 108 a, b. During the left and right turns of the vehicle 16, the vehicle 16 is turning about a contact patch 120 directly below the rotational axis 122 of the front wheel 118. The rear portion 100 of the deck 14 pivots about the contact patch 120 to effectuate the left and right turns of the vehicle 16. As shown in FIG. 7, the contact patch 120 is directly below the rotational axis 122 of the front wheel 118. Due to the weight of the rider and the flexibility of the front tire, the contact patch 120 is defined by an elongate area (see FIG. 7) of the front wheel 118 contacting the surface or ground and is not a point.

Referring now to FIG. 7, the deck 14 may have the raised rear portion 100 and a lowered front portion 123 which lowers the center of gravity of the rider 200 and also reduces the likelihood of the rider flipping over the handlebars as discussed herein. The lower front portion 123 and the raised rear portion 100 are joined to each other by an angled transition portion 124. The transition portion 124 is angled so that placement of the rider's feet on the transition portion 124 will be uncomfortable and urges the rider to place his/her feet on the lower front portion 123 or as close to or under the rotational axis 122 of the front 118, as shown in FIG. 7A, to position the rider on the deck most optimal for doing a 180° rotational (see FIG. 7A) trick on the scooter. The left and right feet of the rider are supported by the left and right portions 126 a, b, (see FIG. 6). The deck 14 is sufficiently flexible to provide cushioning due to vibration and impacts of uneven riding surface. The cushioning provides comfort to the rider in riding the vehicle 16.

Figure 8:
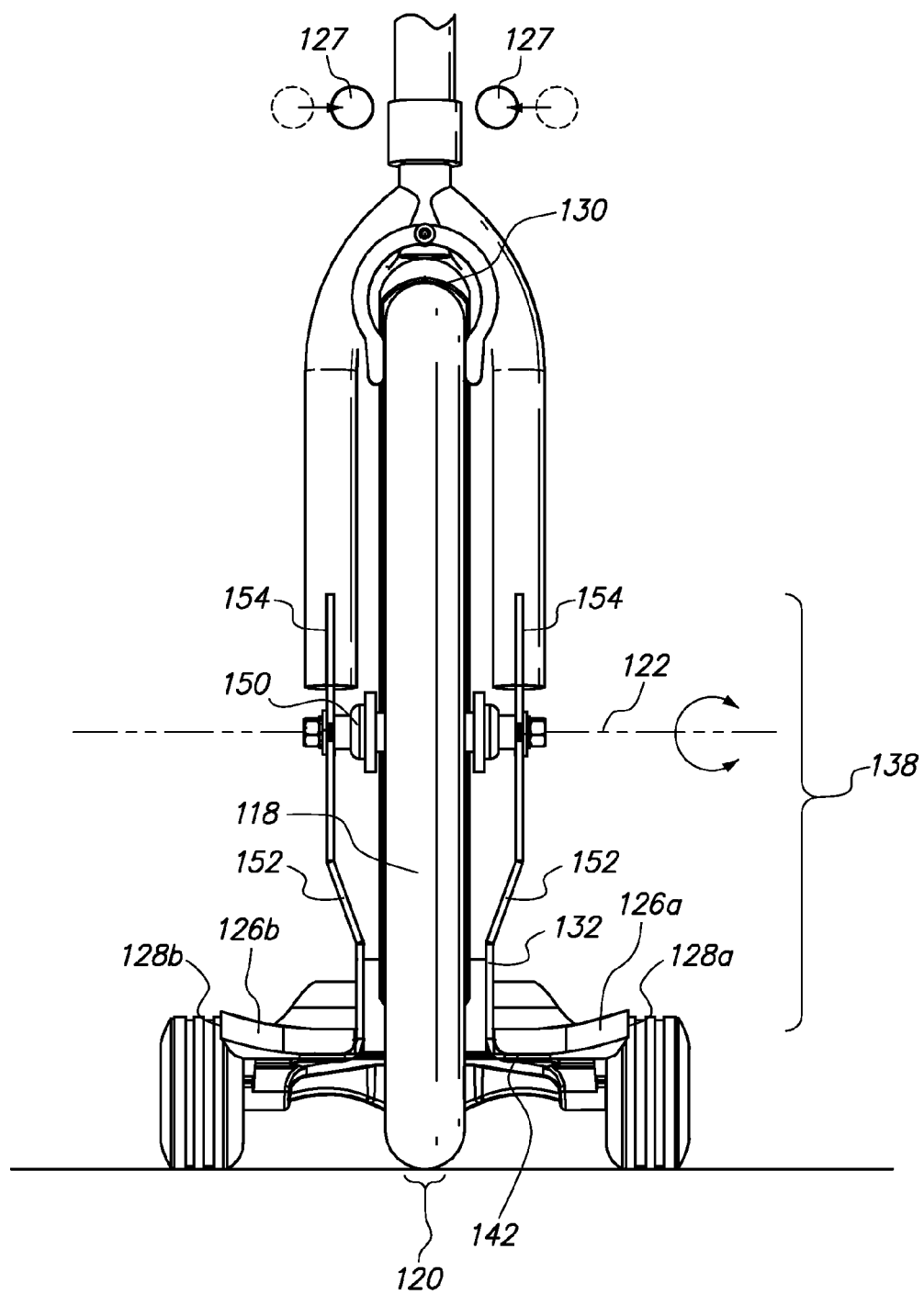
FIG. 8 is a front view of the scooter shown in FIG. 6.

Referring now to FIG. 8, the left and right portions 126 a, b are curved upward at its outer peripheral edge 128 a, b. The curved left and right portions 126 a, b allow the rider to achieve a tighter turn without having the deck contact or grind against the ground. When the rider steps on the left and right portions 126 a, b, the curved configuration thereof 126 a, b urges the knees 127 of the rider closer together above the front wheel guard 130. Also, the upwardly curved configuration of the left and right portions 126 a, b urges the feet of the rider closer to each other and against the foot guard 132. This position provides for an optimal riding stance. The wheel guard 130 prevents the user's leg from rubbing against the front wheel 118 during riding. The foot guard 132 prevents the feet of the rider from getting caught between the left and right portions 126 a, b and the front wheel 118.

Referring back to FIG. 7, the front wheel 118 may be about six to ten times larger than the rear wheels 108 a, b in diameter. The purpose of the larger front wheel 118 is to provide for lower rolling resistance as well as a longer longitudinal tire patch 120 (see FIG. 7A) so that the front wheel 118 can roll over gaps in the ground surface or rocks and/or uneven surfaces easier.

As discussed above, the deck 14 is shaped to position the rider's feet closer to or under the rotational axis 122 of the front wheel 118. The center of gravity 200 of the rider is preferably close to the rotational axis 122 of the front wheel 118 because this position allows the rider to more easily perform a 180 degree trick which is shown in FIG. 7A. To accomplish the 180° rotational trick with the scooter 16, the user or rider lifts the rear wheels 108 a, b off of the ground. The rider then shifts his/her weight around the contact patch 120 of the front wheel 118 to the ground. The rider swings around the contact patch 120. The contact patch 120 is located directly below the rotational axis 122 of the front wheel. An axis extending from the contact patch 120 defines a rotational axis 216 (see FIGS. 7 and 7A) of the vehicle 16 during the 180 degree trick. Since the rider's center of gravity 200 is close to the contact patch 120, the centrifugal force which urges the rider off of the scooter is minimized since the distance 214 between the center of gravity 200 and the contact patch 120 is minimized. The deck 14 was formed to urge the rider's feet forward as discussed above. Accordingly, it is easier for the rider to perform the 180° turn or trick. If the distance 214 between the center of gravity 200 of the rider and the rotational axis 216 is large then it would be more difficult to perform the 180 degree trick since the centrifugal force when swinging around the contact patch 120. would tend to urge the rider off of the vehicle 16 and destabilize the rider's balance.

Unfortunately, when the center of gravity 200 of the rider is closer to the rotational axis 122 of the front wheel 118, it is more likely that the rider will flip over the handlebars when the vehicle 16 rides over a bumpy surface or hits a rock or some other obstacle. This is the reason that mountain bikers will shift their weight as far back as possible when traversing down rocky terrain. In the vehicle discussed herein, the large front wheel 118 (e.g., 20 inch diameter) mitigates the rider from flipping over the handlebars in a few different ways. The angle of attack of the larger front wheel 118 is better than the angle of attack on a smaller wheel so that the front wheel is more likely to roll over the rock or other obstacle instead of becoming stuck by the rock or other obstacle. Second, as the rider is riding forward, the general principle is that the moment created by the weight 202 of the rider about the rotational axis 122 must always be greater than any deceleration moment. Otherwise, the rider will fly over the handlebars. The weight moment t of the rider is equal to the gravitational force 202 multiplied by the distance 214 from the center of gravity 200 of the rider to the rotational axis 122 of the front wheel. The deceleration moment is equal to the deceleration force 206 created when the front wheel 118 hits an obstacle multiplied by vertical distance 204 from the center of gravity 200 of the rider to the rotational axis 122. If deceleration force 206 creates a greater moment about rotational axis 122 compared to the weight 202 of the rider 16, then the rider will flip over the handlebars. If the front wheel 118 had a diameter equal to the rear wheels 108 a, b as represented by dash lines 208, then the moment created by the deceleration force 206 would be increased proportionally to the increased distance to the rotational axis 210 represented by distance 212. Accordingly, the large front wheel 118 reduces the deceleration moment by reducing the moment arm 204 to mitigate the rider from flipping over the handlebars. The lowered front portion 123 also drops the center of gravity 200 of the rider to reduce the moment arm 204. The rider can position his/her center of gravity 200 closer to the contact patch 120 and the rotational axis 122. The vehicle is designed to mitigate flipping over the handlebars by reducing the moment arm 204 so that the rider is able to accomplish the 180° trick more easily.

Figure 9:
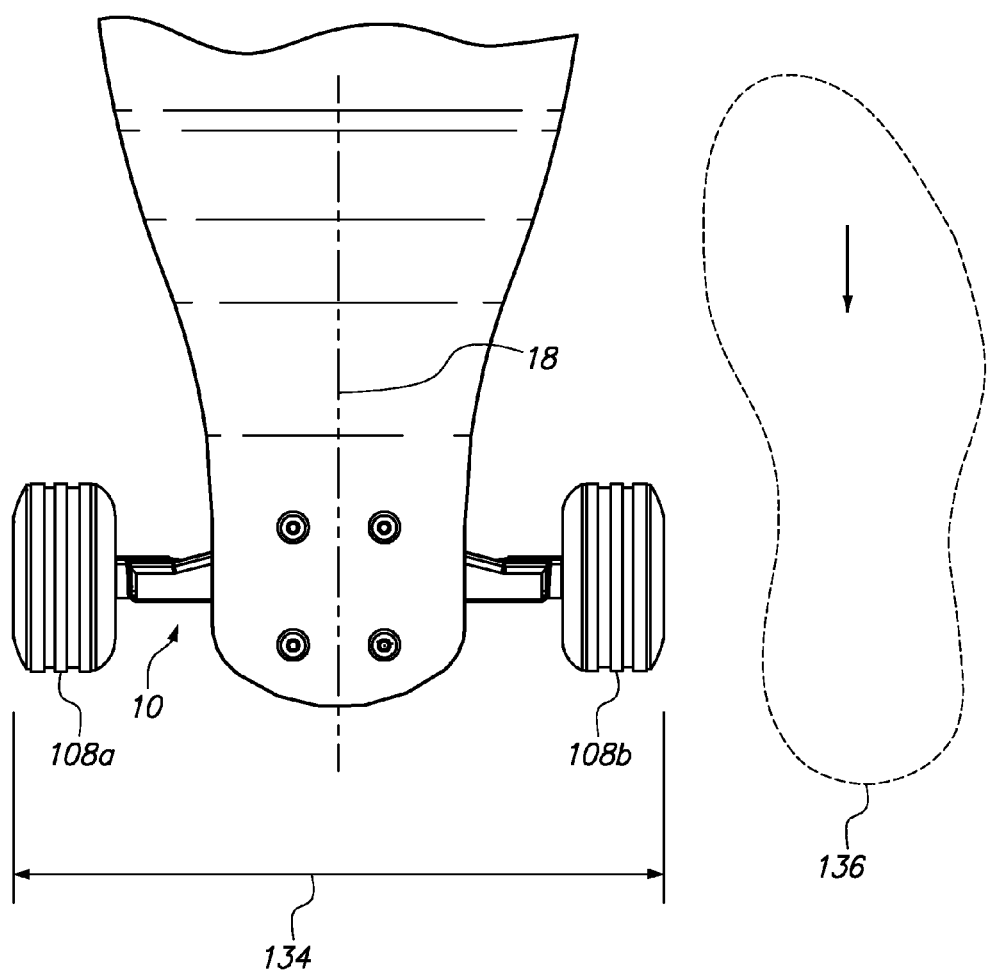
FIG. 9 is a top view of the deck and skate truck shown in FIG. 6.

Referring now to FIG. 9, the skate truck 10 including the wheels 108 a, b may have a width 134. The wheels 108 a, b are centered about the longitudinal axis 18 and is spread apart as wide as possible to provide a stable platform upon which the vehicle 16 and the rider are supported but not too wide to interfere with tight turning. The width 134 is limited by the rider's ability to push forward without hitting the wheel 108 b with his/her foot 136. If the rider has a reverse stance then the width 134 of the wheels 108 a, b is limited to the extent that the other foot of the rider does not hit wheel 108a as the rider is propelling the vehicle forward 16 with his/her foot 136. The front wheel 118 may be powered by a motor. In this instance, the width 134 is not limited by the rider's ability to push forward without hitting the wheels 108 a, b with his/her feet 136.

Figure 10:
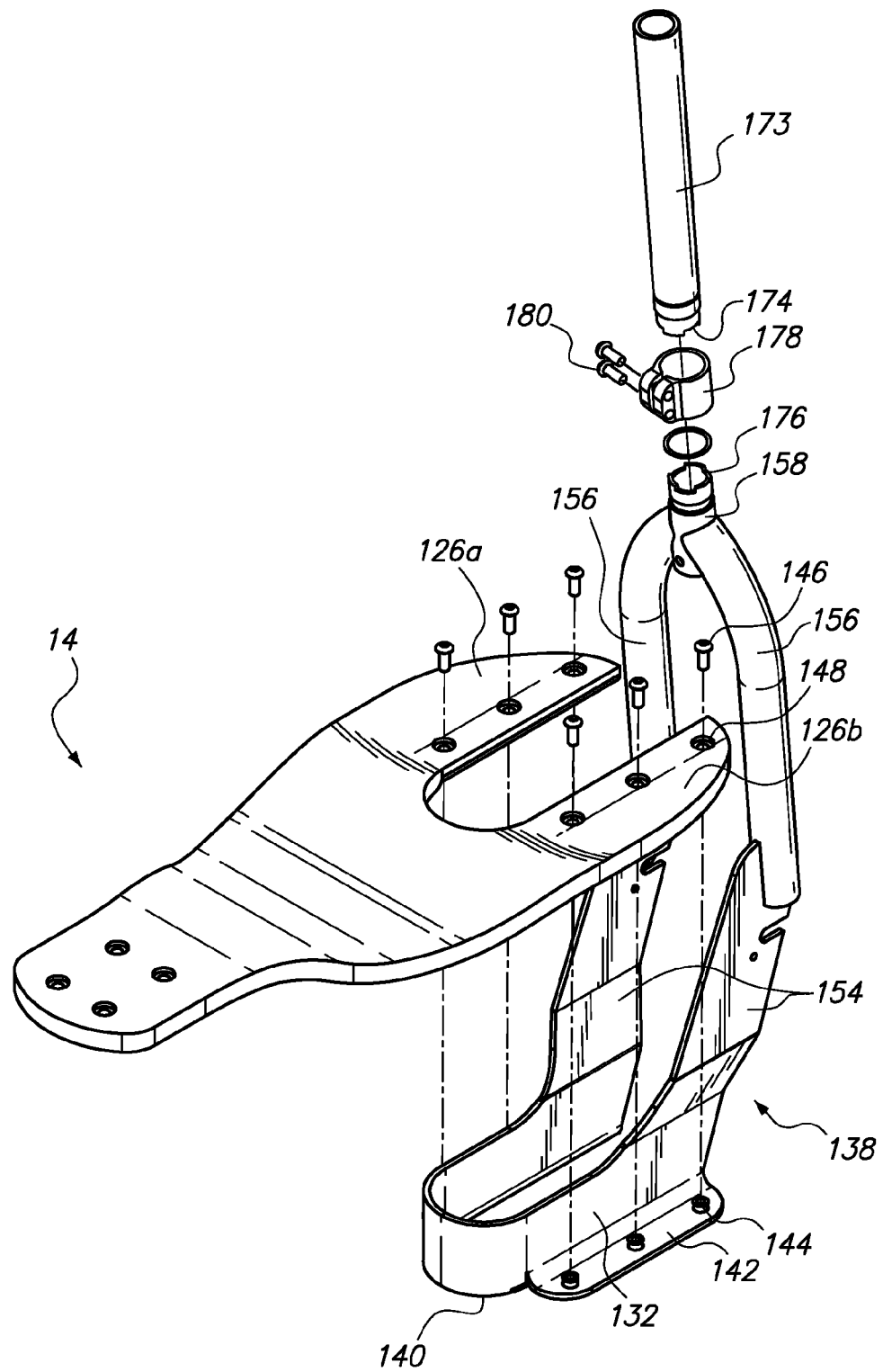
FIG. 10 is an exploded perspective view of the deck and foot guard/front fork shown in FIG. 6.

Referring now to FIG. 10, the deck 14 is secured to the frame 138 by way of screws. In particular, the frame 138 may define the foot guard 132 which circumscribes an inner peripheral of the left and right portions 126 a, b of the deck 14. The bottom end 140 of the foot guard 132 has flanges 142 on both sides of the foot guard that extend under the left and right portions 126 a, b. The left flange in FIG. 10 is not visible but can be seen in FIG. 8. The left and right portions 126 a, b are supported on top of the flanges 142. The flanges 142 may have one or more raised nubs 144 having a threaded hole which receives screws 146. The left and right portions 126 a, b may have holes 148 that receive the raised nubs 144 and may also be countersunk to receive the screws 146 and allow the head of the screws 146 to lay flush against the upper surface of the left and right portions 126 a, b. Since the deck 14 rests on top of the flanges 142, there is less opportunity for the screws 146 to be stripped out of the threaded holes of the raised nubs 144. The flanges 142 provide a secure and rigid support for the deck 14 and the weight of the rider.

Referring back to FIG. 8, the foot guard 132 is maintained as close to the front wheel 118 as possible without rubbing against the front wheel 118. To this end and also to accommodate the wider hub 150, the frame 138 is skewed outward by angle sections 152 before the frame straightens out to parallel sections 154. The bend caused by the angle sections 152 adds rigidity to the frame 138. Also, the selection of material for the frame 138 can be made to further rigidify the frame 138.

Referring to FIG. 10, forks 156 may extend from the parallel sections 154. Forks 156 are joined to each other at crown section 158. The front wheel 118, instead of being attached to the fork 156, may be attached to the parallel section 154 (see FIGS. 8 and 11). The parallel sections 154 may have slots 160 to receive the hub 150 of the front wheel 118. The front wheel 118 is secured to the parallel section 154 by way of nuts 162 threaded onto the hub 150 as shown in FIG. 11.

Figure 11:
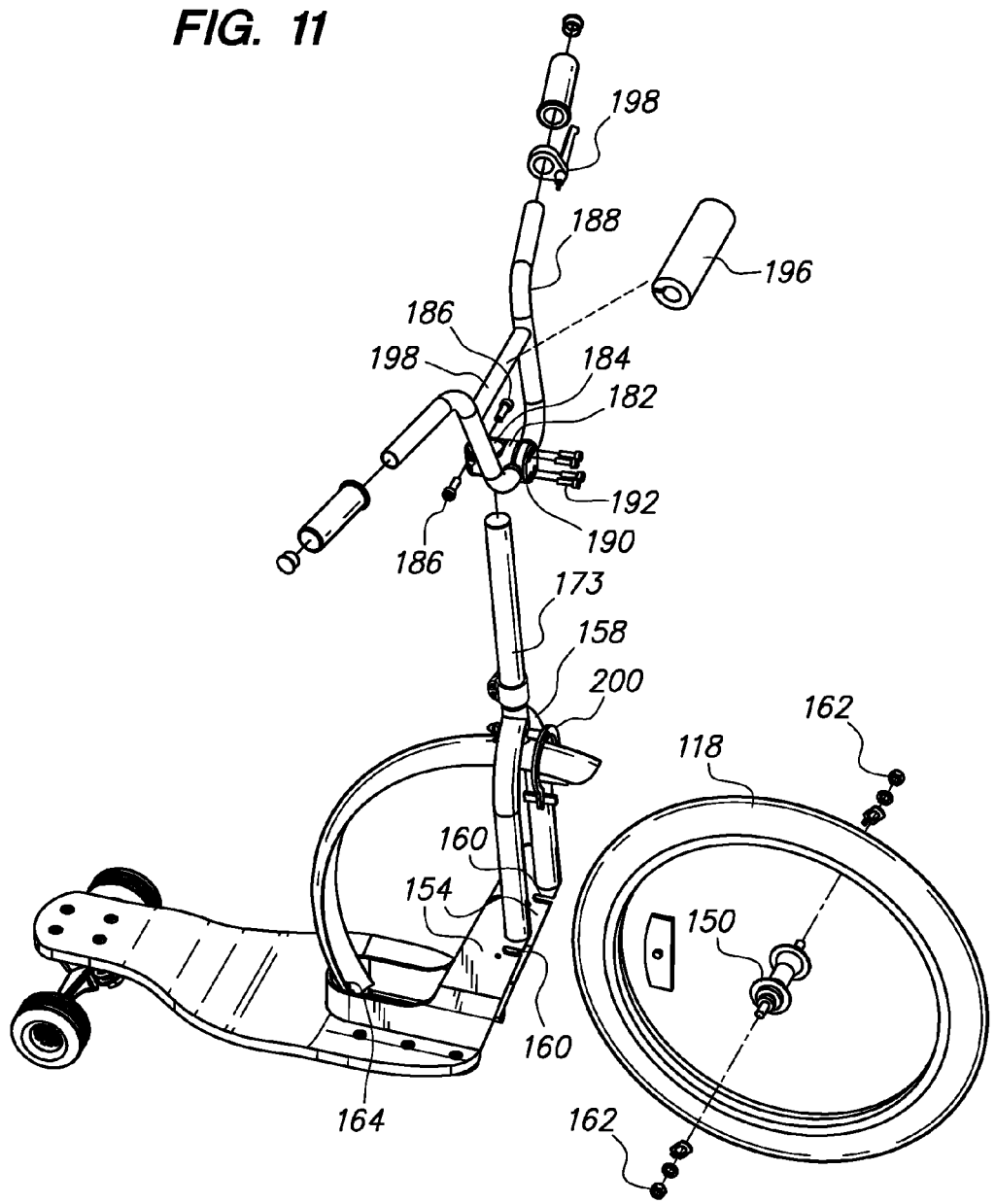
FIG. 11 is an exploded perspective view of a handle bar and front wheel shown in FIG. 6.

As shown in FIGS. 7 and 11, the front wheel guard 130 may be mounted to the crown 158 of the forks 156 and to a bracket 164 adjacent the foot guard 132. In particular, the front wheel guard 130 may have two holes for screws to attach the front wheel guard 130 to the bracket. The front wheel guard 130 may additionally have a bracket 170 that allows the front wheel guard 130 to be attached to the crown 158 by way of nut and bolt connection 172a, b. The front wheel guard 130 when mounted is closely adjacent to the front wheel 118. As the rider is riding the vehicle 16, the rider's leg may push into the front wheel guard 130. The front wheel guard 130 prevents the front wheel 118 from rubbing and burning the rider's leg. Instead, the front wheel guard 130 bends/flexes and rubs against the front wheel 118 and makes a loud noise to indicate that the rider should move his/her leg to prevent the rubbing and burning of the front wheel guard 130 against the front wheel 118.

Referring to FIG. 10, a head tube 173 may extend up above the crown 158 of the fork 156. The lower portion of the head tube 173 and the crown 158 may have mating castellated configurations 174 and 176. The castellated configurations 174, 176 meet up to each other to prevent rotation of the head tube 173 during the operation of the vehicle 16. A clamp 178 circumscribes the castellated configuration 174, 176 of the head tube 173 and crown 158m and can be tightened by way of screws 180 to rigidly secure the head tube 173 to the crown 158. Accordingly, the head tube 173 may be removably attached to the crown 158 for the purposes of disassembly for shipping and reassembly at a retail outlet or a customer's home.

Referring now to FIG. 11, a handle bar 182 stem may be mounted to the head tube 173 by inserting the head tube 173 into hole 184. Screws 186 clamp the handlebar stem 182 to the head tube 173. A handlebar 188 may be secured to the handlebar stem 182 by way of plate 190, which secures or is tighten onto the handlebar stem 182 by way of screws 192. Accordingly, the handlebar 188 is also removably attachable to the head tube 173 for the purposes of compact shipping as well as ease of assembly after shipping. A cushion 196 can be wrapped around a crossbar 198 of handle bar 188 to cushion a blow to the rider in the event of a fall.

The head tube 173 may also be telescoping. It is contemplated that the head tube 173 may have upper and lower tubes which collapse into each other. The outer tube may have a compression lock which when engaged fixes the position of the inner tube to the outer tube. The purpose of the collapsible telescoping head tube 173 is for allowing the vehicle 16 to be conveniently collapsed and folded for shipping.

The vehicle 16 may be disassembled and laid in a box for compact shipping from the manufacturing point to the retail point. In particular, the skate truck 10 may be removed from the deck 14. The deck 14 may be removed from the frame 138. The handlebar 188 and the head tube 173 may be disassembled and laid into box 194 for shipment.

The vehicle 16 additionally has a front brake system (see FIG. 7). The front brake system 196 may have a brake lever 198 (see FIG. 11) which operates rim brakes 200 (see FIG. 11). Although a rim break is shown, a disk brake may also be mounted and operable by the front brake lever 196.

Moreover, although the vehicle 16 is shown as being a foot powered vehicle, it is also contemplated that a motor may be mounted to the front wheel and powered by an electrical battery with throttle attached to the right side of the handlebar 188.

The above description is given by way of example, and not limitation. Given the above disclosure, one skilled in the art could devise variations that are within the scope and spirit of the invention disclosed herein, including various ways of mounting the truck to the deck. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A suspension for a vehicle, the suspension comprising:
   a base mountable to a frame of the vehicle, the base having at least three semi-circularly shaped grooves within first common plane, the at least three semi-circularly shaped grooves having a first center point, the at least three semi-circularly shaped grooves defining a pivot axis perpendicular to the first common plane and located at the first center point;
   a hanger for mounting wheels so that the vehicle can roll on a surface, the hanger having at least three mounting recesses within a second common plane, the at least three mounting recesses defining a second center point, the second common plane of the hanger being disposed parallel to the first common plane of the base, the second center point positioned on the pivot axis; and
   at least three ball bearings seated within the mounting recesses and traversable along the at least three semi-circularly shaped grooves when the hanger rotates about the pivot axis.

2. The suspension of claim 1 further comprising a biasing member for urging the first and second common planes closer to each other so that the hall bearings slide within the grooves as the hanger rotates about the pivot axis.

3. The suspension of claim 2 wherein the biasing member is a compression spring.

4. The suspension of claim 3 wherein each of the: at least three semi-circularly shaped grooves has a contact surface which defines a ramp profile, the at least three ball bearings slide against the contact surfaces and compress or decompress the compression spring as the at least three ball bearings slide against the contact surfaces based on the ramp profile.

5. The suspension of claim 4 wherein the ramp profiles of the three semi-circularly shaped grooves are identical to each other, the ramp having a progressive profile, regressive profile, linear profile or combinations thereof.

6. The suspension of claim 3 further comprising a thrust bearing disposed between the compression spring and the hanger to mitigate binding between the hanger and the spring as the hanger rotates about the pivot axis.

7. The suspension of claim 1 wherein the at least three semi-circularly shaped grooves are symmetrically identical to each other.

8. The suspension of claim 1 wherein the pivot axis is skewed with respect to longitudinal axis of the frame of the vehicle.

9. A vehicle comprising:
a deck defining a front portion, a rear portion, a bottom surface and a top surface;
a first suspension system mounted to the bottom surface at the rear portion of the deck, the first suspension comprising
a base mountable to a frame of the vehicle, the base having at least three semi-circularly shaped grooves within a first common plane, the at least three semi-circularly shaped grooves having a first center point, the at least three semi-circularly shaped grooves defining a pivot axis perpendicular to the first common plane and located at the first center point;
a hanger for mounting wheels so that the vehicle can roll on a surface, the hanger having at least three mounting recesses within a second common plane, the at least three mounting recesses defining a second center point, the second common plane of the hanger being disposed parallel to the first common plane of the base, the second center point positioned on the pivot axis; and
at least three ball bearings seated within the mounting recesses and traversable along the at least three semi-circularly shaped grooves when the hanger rotates about the pivot axis.

10. The vehicle of claim 9 wherein the pivot axis is skewed with respect to a longitudinal axis of the deck.

11. The vehicle of claim 9 further comprising a second suspension system mounted to the bottom surface at the front portion of the deck, the first and second suspension systems mounted in opposite directions to each other, the second suspension system comprising:
a base mountable to a frame of the vehicle, the base having at least three semi-circularly shaped grooves within a first common plane, the at least throe semi-circularly shaped grooves having a first center point, the at least three semi-circularly shaped grooves defining a pivot axis perpendicular to the first common plane and located at the first center point;
a hanger for mounting wheels so that the vehicle can roll on a surface, the hanger having at least three mounting recesses within a second common plane, the at least three mounting recesses defining a second center point, the second common plane of the banger being disposed parallel to the first common plane of the base, the second center point positioned on the pivot axis; and
at least three ball bearings seated within the at least three mounting recesses and traversable along the at least three semi-circularly shaped grooves when the hanger rotates about the pivot axis.

\* \* \* \* \*